Figure 1:
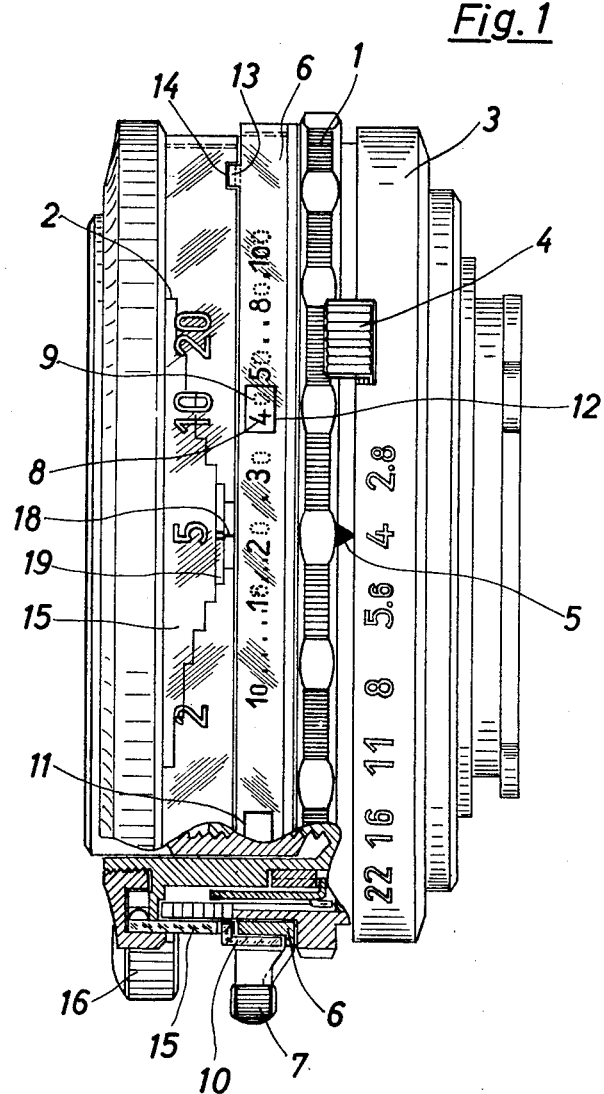

Dec. 11, 1962  R. KREMP  3,067,663
APERTURE CALCULATING STRUCTURE FOR CAMERAS
Filed Oct. 9, 1958  2 Sheets-Sheet 1

INVENTOR.
BY  RUDOLF KREMP
Michael S. Striker
Attorney

Dec. 11, 1962   R. KREMP   3,067,663
APERTURE CALCULATING STRUCTURE FOR CAMERAS
Filed Oct. 9, 1958   2 Sheets-Sheet 2

INVENTOR.
BY  RUDOLF KREMP
Michael S. Striker
Attorney

United States Patent Office 3,067,663
Patented Dec. 11, 1962

3,067,663
APERTURE CALCULATING STRUCTURE
FOR CAMERAS
Rudolf Kremp, Munich, Germany, assignor to Firma Agfa Aktiengesellschaft, Leverkusen-Bayerwerk, Germany
Filed Oct. 9, 1958, Ser. No. 766,279
Claims priority, application Germany Oct. 15, 1957
11 Claims. (Cl. 95—44)

The present invention relates to cameras.

More particularly, the present invention relates to cameras which are adapted to indicate to the operator the proper value of the aperture size which is to be set into the camera.

Although cameras are known wherein the device for adjusting the camera so as to focus the same on a subject at a given distance from the camera is coupled with the device for adjusting the aperture of the camera so as to automatically set the proper aperture into the camera for a predetermined characteristic of the flash apparatus, for a particular film sensitivity, and for a particular distance of the subject, such devices have the disadvantage of being relatively complex, requiring a considerable amount of space, and substantially increasing the total cost of the camera. Moreover, since such devices, or at least part thereof, must be fixedly arranged on the camera housing, they cannot be used with cameras having interchangeable objective assemblies, or if they are used in such cameras their construction is even more complex.

Also, calculating discs or scales are known for quickly calculating the aperture value for given characteristics of the flash apparatus and for a given distance of the subject from the camera. Such devices conventionally include several concentric discs or rings turnable with respect to each other and having scales of indicia relating to such factors as the distance of the subject, the size of the aperture, the characteristic of the flash apparatus, and the film sensitivity. Such devices can be arranged either on a housing of the flash apparatus, at the rear of the camera, or it may be in the form of an entirely separate device. The disadvantage of these structures resides in the fact that they are spaced from the rings of the objective assembly which regulate the size of the aperture, the exposure time, and the distance of the subject. These structures require the operator to perform operations entirely distinct from the setting of the camera itself and they greatly reduce the speed with which it is possible to take successive photographs.

One of the objects of the present invention is to provide a camera with an aperture calculating structure which forms part of the objective assembly while at the same time being of an extremely simple construction and requiring very little space so that the cost of the objective assembly as well as the size thereof are not undesirably increased so that the structure of the invention can be used practically with interchangeable objectives.

It is also an object of the present invention to provide an aperture calculating structure which can conveniently be incorporated into objectives of all types, so that the structure of the invention can be used with interchangeable objectives irrespective of the different natures of the interchangeable objectives.

It is a further object of the present invention to provide an objective assembly with an aperture calculating structure located closely adjacent to the adjusting members of the objective assembly so that the calculation and the adjustment of the camera can take place simultaneously. Thus, it is possible with the structure of the invention to very rapidly make successive photographs even if adjustments are necessary between the photographs.

With the above objects in view of the present invention includes in a camera a support means which forms part of the objective assembly of the camera and a focusing ring turnably carried by the support means. An inner ring is turnably carried by the support means adjacent to the focusing ring and an index means is also carried by the support means to cooperate with the focusing ring and the inner ring. The focusing ring carries indicia which indicates the distance of the subject from the camera while the inner ring carries indicia indicative on the one hand of characteristics of different flash apparatus and on the other hand of different aperture sizes, both of these rings being set at predetermined angular positions independently of each other by cooperation with the index means. A transparent outer ring surrounds and is turnable with respect to the inner ring and is formed with at least one window which registers with the indicia of the inner ring, and this outer ring is connected with the focusing ring for turning movement therewith so that the registry of the window of the outer ring with the indicia of the inner ring is determined by the angular positions of both the focusing ring and the inner ring. Thus, it is possible to read at the window of the outer ring the aperture size which is to be set into the camera.

Figure 2:
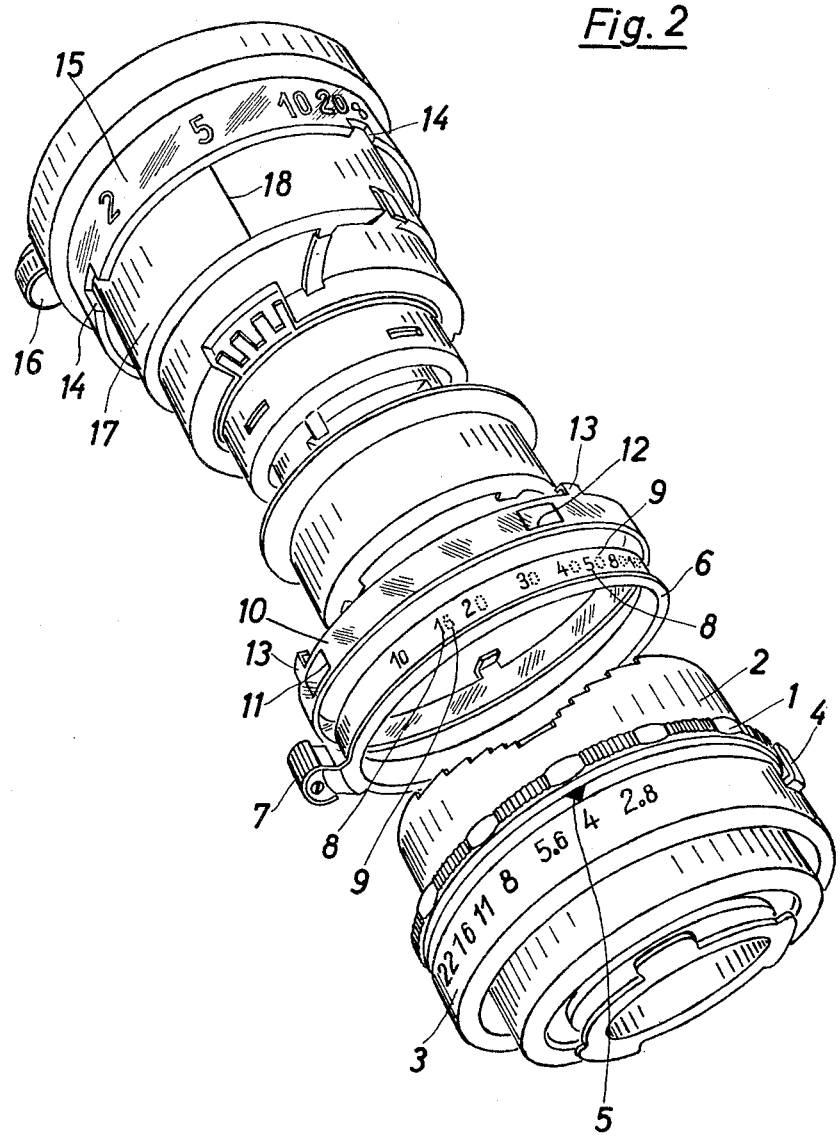

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a side elevational view, partly in section, of an objective assembly which includes a structure according to the present invention; and FIG. 2 is a perspective exploded view of the objective assembly of FIG. 1.

Referring now to the drawings, the objective assembly illustrated therein includes a tubular support means 1 adapted to be releasably locked with the camera housing and having for this purpose at its rear end the bayonet projections shown at the lower part of FIG. 2. At its front end the tubular support means 1 has a portion 2 provided with a stepped edge shown in FIG. 2 which is adapted to be used for indicating the depth of field. The support means 1 turnably carries the ring 3 which adjusts the size of the aperture of the diaphragm of the camera, this ring 3 having thereon indicia which indicate the various aperture sizes. The ring 3 is connected in a known way with diaphragm adjusting structure which adjusts the size of the diaphragm aperture upon turning of the ring 3, and a projection 4 is fixed to and extends from the ring 3 to facilitate manual turning thereof, the ring 3 cooperating with a stationary index 5 located on the exterior surface of the tubular support means 1.

The tubular support means 1 supports for turning movement an inner ring 6 of a scale means of the present invention, this inner ring 6 being coaxial with and located slightly in advance of the ring 3. The ring 6 fixedly carries a handle 7 which projects therefrom to facilitate turning of the ring 6. This ring 6 carries at its outer surface indicia which is indicative of characteristics of different flash apparatus. For example, different flash bulbs will have different characteristic numbers appearing on the ring 6, and the operator will set the ring 6 at an angular position corresponding to such a number which is given by the manufacturer of the flash bulb. It will be noted that the indicia on the ring 6 is in the form of a plurality of numerals angularly distributed along the exterior of the ring 6 and each including two digits 8 and 9, the digits 8 being colored differently from the digits 9 for the purpose described below.

An outer ring 10 coaxially surrounds and is turnable on the ring 6, this outer ring 10 acting as a rotary index member and being transparent so that the indicia of the ring 6 is visible therethrough. This outer ring 10 is formed with a pair of angularly displaced windows 11 and 12 adapted to register with the indicia of the ring 6. The ring 6 is turnably carried by the stationary forward portion 2 of the support means 1, and this portion 2 of the support means 1 also supports a focusing ring 15 for turning movement.

The focusing ring 15 is located just ahead of the ring 6 and is transparent so that the stepped front edge of the tubular portion 2 is visible through the focusing ring which carries indicia indicative of the distance between the subject and the camera.

The focusing ring 15 is formed at its rear edge with a plurality of angularly displaced notches 14 which respectively receive a plurality of angularly displaced projections 13 of the outer ring 10 of the scale means 6, 10 so that in this way the ring or rotary index member 10 is constrained to turn with the focusing ring 15. The ring 15 fixedly carries a projection 1 which facilitates manual turning of the ring 15, and the objective is adjusted in a known way upon manual turning of the ring 15.

When all of the parts of the objective are assembled together, the support means 1, 2 fixedly carries within the tubular portion 2 but projecting forwardly beyond the rearmost part of the stepped edge thereof a tube 17 provided at its outer surface with an index 18 which is stationary and visible through the ring 15 for cooperating with the latter as well as with the ring 6.

A second index 19 extends circumferentially with respect to the optical axis, is also visible through the ring 15, and is connected in a manner not forming part of the present invention to the ring 3 to be moved along the optical axis upon turning of the ring 3. This index 19 may, for example, take the form of an edge of a sleeve which is moved along the optical axis upon turning of the ring 3. Referring to FIG. 1, for example, it will be seen that the numeral 5 of the focusing ring 15 is in register with the index 18, and the stepped edge of the tubular portion 2 is visible through the ring 15. Depending upon the angular position of the ring 3, the index 19 will intersect the opposite stepped edges of member 2 at different locations along the optical axis. In the position indicated in FIG. 1 the index 19 intersects the stepped edge of member 2 relatively close to its rearmost part so that the indicated depth of field ranges from approximately 4 to approximately 6 feet. However, with a different aperture setting of the ring 3 for the same angular position of the ring 15 which is indicated in FIG. 1 the index 19 may be located much nearer to the front edge of the ring 15 so as to cooperate with the stepped edge of member 2 to indicate a depth of field of 2–20 feet, for example.

When it is desired to determine the proper aperture for a given characteristic of the flash apparatus and for a given distance of the subject from the camera, the focusing ring 15 is first turned to align with the index 18 the number on the ring 15 which is indicative of the distance of the subject from the camera, this distance being 5 feet in the example illustrated in FIG. 1. During turning of the ring 15, the rotary transparent index ring 10 of course turns therewith and is thus angularly adjusted simply by manual setting of the focussing ring 15. Then the inner ring 6 is angularly adjusted according to the characteristic of the particular flash apparatus used with the camera, this characteristic being 20 in the example illustrated in FIG. 1 where the numeral 20 is shown aligned with the index 18. At this time a number will appear in one of the windows 11 and 12. In FIG. 1 the window 12 registers with the numeral 40 which appears therethrough. The structure is so designed that the right window 12, as viewed from the right side of FIG. 1, indicates all aperture sizes up to 10, so that in the illustrated example the first digit 8 indicates the number of the aperture size just ahead of the decimal point while the second digit 9 of a different color than the digit 8 indicates the number just after the decimal point. Therefore, in the example illustrated in FIG. 1, for a distance of 5 feet from the camera to the subject and for a flash characteristic of 20 the required aperture size is 4.0. The ring 3 is then turned by the operator to set this aperture value into the camera, and the aperture size 4 is shown in FIG. 1 in registry with the index 5. At the same time that the ring 3 is turned, the index 19 is moved in the manner described above to give the depth of field. Thus, it is possible to read through the transparent ring 15 the depth of field for a given aperture size and distance between the camera and the subject.

If, in contrast to the example of FIG. 1 the distance between the camera and subject is extremely small while the flash characteristic number is relatively high, then the proper size of the aperture will appear in the window 11. The latter window indicates all aperture sizes from 10 and higher, so that when the aperture size appears in the window 11 the digit 8 is in the tens position and the differently colored digit 9 is in the ones position of the numeral indicating aperture size, so that the aperture size to be set into the camera with the ring 3 is in this case identical with the numeral appearing in the window 11.

Therefore, with the structure of the invention only a single additional scale means 6, 10 is required to be assembled with the structure of the objective assembly in order to provide an indication of the proper aperture size for a given flash characteristic and a given distance of the subject from the camera, the differently colored numerals which correspond to the flash characteristics being selectively placed in registery with the index 18 and the proper aperture size being immediately apparent to one of the windows 11 or 12.

As is apparent from FIG. 2, one scale means 6, 10 may be removed from the assembly and replaced by another scale means 6, 10 of a different construction adapted to the particular objective.

It will be understood that each of the elements described above, or two or more together, may also find a useful application in other types of cameras differing from the types described above.

While the invention has been illustrated and described as embodied in aperture calculating structure for cameras, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a camera, in combination, support means forming part of an objective assembly of the camera and carrying a stationary index; a focusing ring turnably carried by said support means for rotary movement about the optical axis and located next to said stationary index and carrying a distance scale for indicating in cooperation with said index the distance between the subject and the camera; outer and inner concentric members, said outer member being turnable with respect to and located adjacent said inner member and said inner member being turnably carried by said support means for rotary movement about the optical axis, and said outer member being transparent so that said inner member is visible therethrough, one of said members carrying indicia indicative of the characteristic of the flash apparatus used with the camera as well as indicative of the size of the aperture of the diaphragm to be set into the camera, said one member being manually turnable, and located next to said stationary index to be set with respect to the latter at an angular position aligning with said index the characteristic of the flash apparatus used with the camera, and the other of said members being connected to said focusing ring for turning movement therewith and having an index portion located next to and cooperating with the indicia on said one member for indicating the proper size of the diaphragm aperture of the camera.

2. In a camera, in combination, support means forming part of an objective assembly of the camera and carrying a stationary index; a focusing ring turnably carried by said support means for rotary movement about the optical axis and located next to said stationary index and carrying a distance scale for indicating in cooperation with said index the distance between the subject and the camera; a second ring turnably carried by said support means for rotary movement about the optical axis, located adjacent said focusing ring, and carrying indicia indicative of characteristics of flash apparatus used with the camera and indicative of the proper aperture to be set into the camera, said second ring being located adjacent and cooperating with said stationary index to indicate the characteristic of the particular flash apparatus used with the camera at a given time; and a rotary index member located next to and cooperating with the indicia on said second ring and connected to said focusing ring for turning movement therewith about the optical axis to indicate the aperture to be set into the camera.

3. In a camera, in combination, support means forming part of an objective assembly of the camera; a focusing ring turnably carried by said support means for rotation about the optical axis for indicating the distance between the subject and the camera; outer and inner concentric members coaxially surrounding and turnable about the optical axis, said outer member being turnable with respect to said inner member without interfering with the visibility of said inner member and said inner member being turnably carried by said support means, one of said members carrying indicia indicative of the characteristics of different flash apparatus capable of being used with the camera and indicative of the size of the aperture to be set into the camera and said one member being manually turnable, the other of said members being connected to said focusing ring for turning movement therewith about the optical axis and located adjacent and cooperating with the indicia on said one member for indicating the aperture to be set into the camera; and index means carried by said support means and located adjacent said focusing ring and said one member for determining with the indicia of said ring and said one member the angular positions of said focusing ring and said one member according to the distance between the subject and the camera and according to the characteristic of the particular flash apparatus used with the camera, respectively.

4. In a camera, in combination, support means forming part of an objective assembly of a camera; a focusing ring turnably carried by said support means for rotation about the optical axis and for indicating the distance between the subject and the camera; an inner manually turnable ring also turnably carried by said support means for rotation about the optical axis and located adjacent said focusing ring, said inner ring carrying at its outer surface a single scale of indicia each graduation of which is indicative of characteristics of flash apparatus as well as indicative of the aperture to be set into the camera; index means carried by said support means and located adjacent and cooperating with said rings for determining the angular positions thereof; and an outer transparent ring turnable on said inner ring, connected to said focusing ring for turning movement therewith about the optical axis, and formed with at least one window which registers with the indicia on said inner ring to indicate the aperture to be set into the camera.

5. In a camera as recited in claim 4, said inner and outer rings being removably connected to the assembly.

6. In a camera as recited in claim 4, said focusing ring being transparent and said support means including a stationary edge of predetermined configuration visible through the transparent focusing ring and cooperating with the indicia thereon for participating in providing an indication of the depth of field.

7. In a camera as recited in claim 4, said indicia carried by said inner ring being in the form of a plurality of numerals distributed along the exterior surface of said inner ring, and each of said numerals including two digits.

8. In a camera as recited in claim 7, the digits of each numeral having different colors.

9. In a camera as recited in claim 4, said outer ring having a pair of windows angularly displaced with respect to each other and both cooperating with the indicia on said inner ring, one of said windows cooperating with the latter indicia for indicating aperture sizes up to a given value and the other of said windows cooperating with the latter indicia for indicating aperture sizes beyond said given value.

10. In a camera as recited in claim 9, said given value being 10.

11. In a camera as recited in claim 4, said indicia carried by said inner ring being in the form of a plurality of numerals distributed along the exterior surface of said inner ring, and each of said numerals including two digits, said outer ring being formed with a pair of windows angularly displaced with respect to each other and both cooperating with the indicia on said inner ring, one of said windows indicating aperture sizes up to 10 and the indicia which is seen through said one window indicating the first digit and the first decimal digit of aperture sizes up to 10, the other window cooperating with the indicia on said inner ring to indicate aperture sizes greater than 10 and the numerals visible through said other window indicating both digits of the aperture sizes greater than 10.

References Cited in the file of this patent

UNITED STATES PATENTS

| | | |
|---|---|---|
| 2,315,977 | Mihalyi | Apr. 6, 1943 |
| 2,334,075 | Davenport | Nov. 9, 1943 |
| 2,350,009 | Babcock et al. | May 30, 1944 |
| 2,351,834 | Phillips | June 20, 1944 |
| 2,464,559 | Davenport et al. | Mar. 15, 1949 |
| 2,590,161 | Dorsey | Mar. 25, 1952 |
| 2,912,913 | Bretthauer et al. | Nov. 17, 1959 |
| 2,916,981 | Schutz et al. | Dec. 15, 1959 |
| 2,917,983 | Gebele et al. | Dec. 22, 1959 |